(12) United States Patent
Trevisani et al.

(10) Patent No.: US 8,839,682 B2
(45) Date of Patent: Sep. 23, 2014

(54) MEASURING DEVICE

(75) Inventors: Simone Trevisani, Cesena (IT); Alessandro Ditillo, Cesena (IT); Marco Casadei, Cesena (IT)

(73) Assignee: SOILMEC S.p.A., Cesena (FC) (IT)

( * ) Notice: Subject to any disclaimer, the term of this patent is extended or adjusted under 35 U.S.C. 154(b) by 228 days.

(21) Appl. No.: 13/287,834

(22) Filed: Nov. 2, 2011

(65) Prior Publication Data

US 2012/0103083 A1    May 3, 2012

(30) Foreign Application Priority Data

Nov. 2, 2010   (IT) .............................. TO2010A0871

(51) Int. Cl.
*G01L 3/00* (2006.01)
*G01L 5/00* (2006.01)
*G01L 3/14* (2006.01)

(52) U.S. Cl.
CPC ............ *G01L 3/1478* (2013.01); *G01L 5/0061* (2013.01); *G01L 5/0042* (2013.01)
USPC ..................................... 73/862.08; 73/152.49

(58) Field of Classification Search
USPC ................... 73/760, 152.49, 862.08
See application file for complete search history.

(56) References Cited

U.S. PATENT DOCUMENTS

| 3,589,179 | A |   | 6/1971 | Nicolau |
| 3,885,426 | A | * | 5/1975 | Hudson et al. ............. 73/862.31 |
| 4,332,160 | A | * | 6/1982 | Baragar et al. ..................... 73/84 |
| 4,435,988 | A |   | 3/1984 | Corry et al. |
| 4,860,837 | A |   | 8/1989 | Robert |
| 5,267,741 | A | * | 12/1993 | Leitner ........................... 279/62 |
| 2011/0023615 | A1 | * | 2/2011 | Piche ............................. 73/700 |

FOREIGN PATENT DOCUMENTS

| EP | 0 640 743 | 3/1995 |
| JP | 58-98511 | 6/1983 |

OTHER PUBLICATIONS

Italian Search Report for Application No. TO20100871 mailed Apr. 13, 2011.

* cited by examiner

*Primary Examiner* — Max Noori
(74) *Attorney, Agent, or Firm* — Merchant & Gould P.C.

(57) ABSTRACT

A device for measuring the torque or force exerted by a drilling machine during a rotation, driving or lifting of a tool. The measuring device includes an engaging device with a drilling battery or with a shaft of at least a drilling equipment or rotary of the machine the engaging device is susceptible of symmetrically or axial-symmetrically locking the drilling battery or the shaft preventing the rotation and/or the axial displacement in a position in correspondence to the tool. The engaging device is associated with at least a transducer for the detection of at least a maximum torque or of at least a maximum force exerted by the machine; and the measuring device is fixedly constrained to the drilling battery or to the shaft.

16 Claims, 9 Drawing Sheets

MEASURING DEVICE

This application claims benefit of Serial No. TO 2010 A 000871, filed 2 Nov. 2010 in Italy and which application is incorporated herein by reference. To the extent appropriate, a claim of priority is made to the above disclosed application.

BACKGROUND

The present invention concerns a measuring device and in detail it concerns a device for measuring the torque of a rotation drilling machine or for measuring the force exerted by a drilling, driving or lifting machine on a tool.

It is known that machines for excavating or drilling the ground comprise devices that are commonly called rotary, for the transmission of the torque to a drilling battery at the end of which an excavation or drilling tool which typically rotates is engaged. The drilling battery typically comprises—in a non exhaustive manner—drilling rods, tubes or blades.

The rotary is moreover engaged so as to slide along a load-bearing structure, which is commonly called antenna; through suitable systems known in the field a pushing or pulling force is exerted onto the rotary and consequently to the drilling battery and therefore to the tool.

In the field of drilling machine tools, in recent years it has become a common requirement to have a performance that is always greater in terms of depth and excavation diameters obtained. This directly reflects onto the performances in terms of torque and pull-push of the machines. Consequently it is important to be able to certify and demonstrate their actual performances. The present finding concerns a device for carrying out rapid and reliable measurements of the maximum torque and pull-push that can be delivered.

From JP58098511 a device is known for measuring the dynamic torque exerted by a motor on a shaft. In particular, the device described in JP58098511 is positioned between a motor and a speed reduction unit, and does not therefore carry out a reading of the torque of a tool. Moreover, said device is a device that is integrated in a machine, and cannot therefore be used to carry out test measurements in series.

From U.S. Pat. No. 3,589,179 a device with a single arm is known for measuring the torque on drilling rods. Said device uses a compression load cell that is mounted at one end of a single arm held by a line. Said line is connected to a winch.

The device described in U.S. Pat. No. 3,589,179 is characterised in that it has the drawback of having a single measuring arm; said arm does not allow a symmetrical measurement of the torque and, in order to balance the force on the load cell, a force is created on the battery of rods which tends to flex it causing possible damage to the battery itself or wrong measurements.

Moreover, the device described in U.S. Pat. No. 3,589,179, is not adapted for measuring also load forces which are axially oriented with respect to a direction in which the excavation or drilling is being carried out. Furthermore, the patent does not describe how to dispense the maximum torque available and how to usefully oppose it. This is a critical problem in the case in which very high torque values are measured.

Finally from EP0640743 a device is known for measuring the dynamic torque on a drilling tool, or bit. Said device also measures a weight on the tool itself, and the extensometric cells which it is provided with are positioned inside radial holes that are obtained on elements of the drilling battery near to the tool itself, thus remaining constantly mounted.

Said device is not adapted for being used for testing in series adapted for detecting the torque or the maximum force that can be exerted by an excavation or drilling machine. It is, indeed, a device that is integrated with the excavation tool which does not therefore make it possible for the machine to dispense the maximum torque or pull-push. It is also very complex due to the need of having an electric rotary joint so as to transfer the signal from the rotating part to the part that is fixed to the machine. It also requires systems for compensating for temperature variations, action of the excavation fluids and effect of the flexing of the battery of rods during the excavation. All these characteristics are necessary for a device that carries out a measurement during drilling but are not useful for a testing device.

SUMMARY

The purpose of the present invention is therefore that of describing a measuring device which does not have the aforementioned drawbacks.

BRIEF DESCRIPTION OF THE DRAWINGS

The invention shall now be described with reference to the attached drawings, which illustrate an embodiment given as an example and not for limiting purposes, in which.

DETAILED DESCRIPTION

Figure 1:
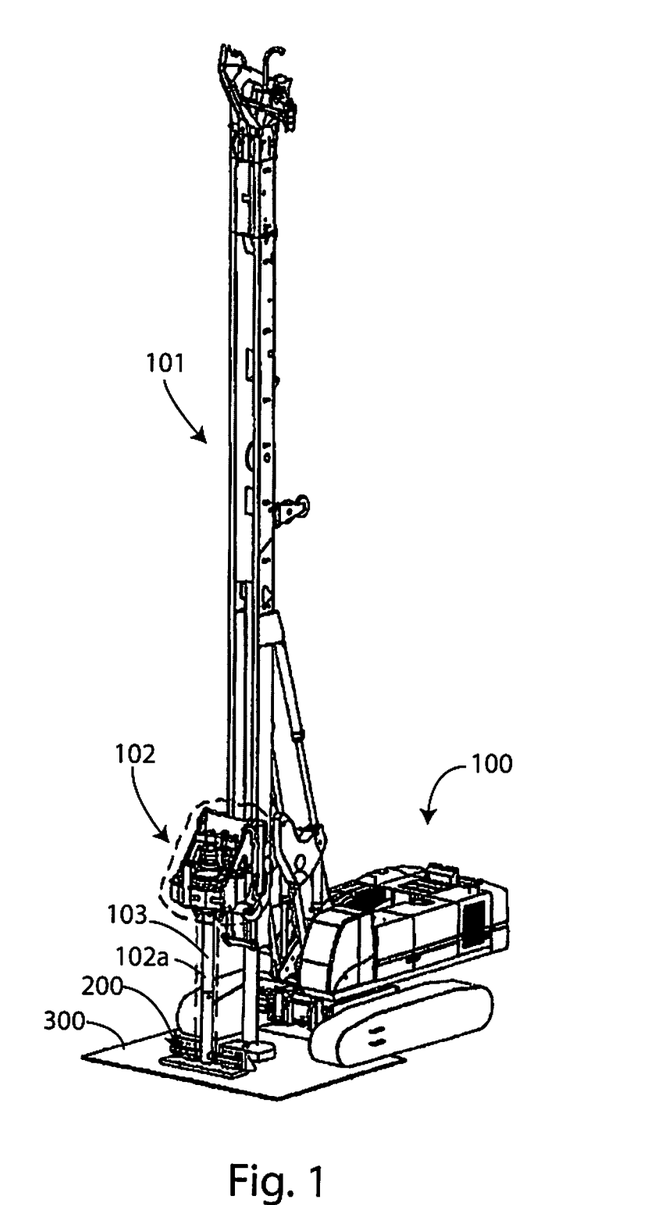
FIG. 1 illustrates an overall view of a drilling machine to which a measuring device according to the present invention is associated.

With reference to FIG. 1, a device for measuring the torque or the force exerted by an excavation or drilling machine on an excavation or drilling tool, is wholly indicated with reference numeral 200.

FIG. 1 represents an excavation or drilling machine 100, comprising an antenna 101 on which a rotary 102, or drilling equipment, is guided and moved, designed so as to transmit a rotation torque to at least one drilling rod 102a, usually made as a battery 103 of drilling rods 102a, to which an excavation or drilling tool 104 is generally engaged (not shown).

Figure 4:
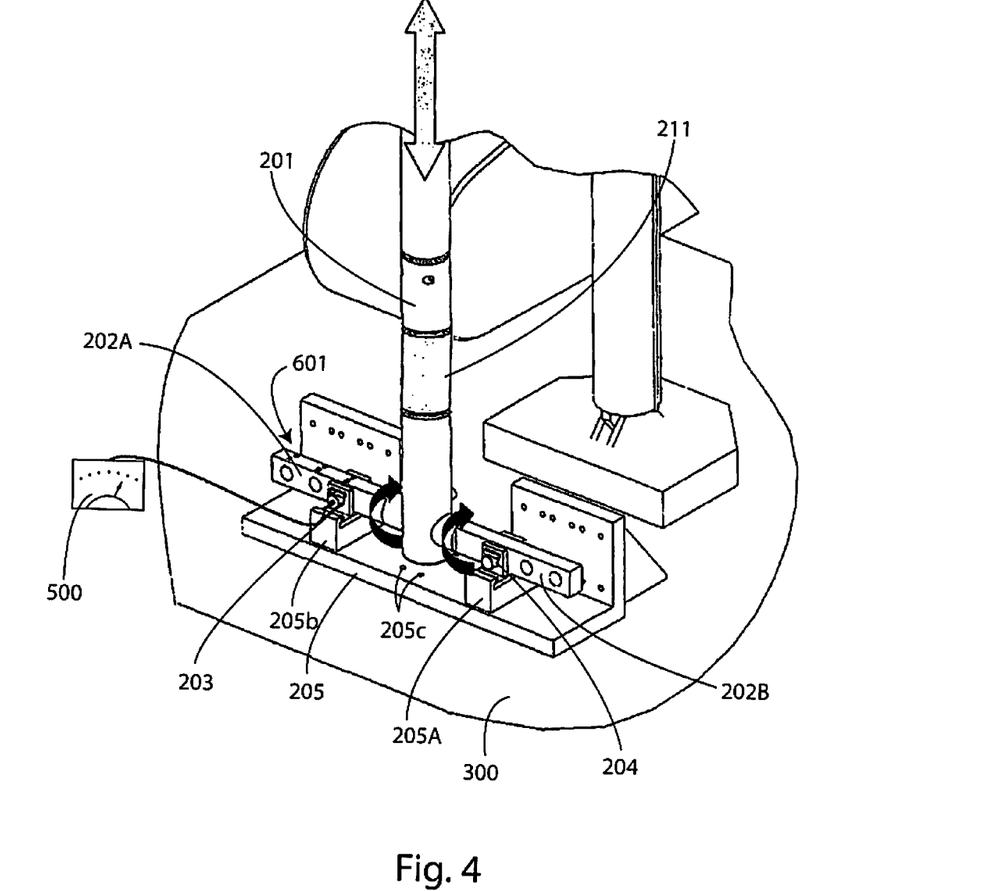
FIG. 4 illustrates a detail of the device of FIG. 1 in a variant thereof.

Device 200 for measuring the torque is connected to a drilling rod 102a, or like in the case of FIG. 4 directly to the shaft of rotary 102 of said machine, by means of engaging means 201 which in the first embodiment represented in FIG. 1 comprise a central cylindrical element, that is capable of blocking drilling rod 102a or shaft 110 of the rotary thus preventing it from rotating.

In the first embodiment of FIG. 1, device 200 is engaged with a plate 300 which is fixed to the ground or blocked by the weight of machine 100 itself.

Device 200 also comprises a torque or force transducer, which in the first embodiment is a load cell 203, which is capable of transforming the force or torque (in this case indirectly) measured in an electrical signal that is susceptible of being read by a tester or more generally by an electric/electronic measuring tool 500 that is capable of showing a user a quantitative measurement of the torque or force exerted by rotary 102 at an excavation or drilling tool, and i.e. at the end part of drilling rod 102a or of the shaft.

Said engaging means 201 also comprise a plurality of arms 202a, 202b, in the figures shown as two, having a first end engaged with central cylindrical element 201 and a second end to which load cell 203 is connected, which in turn is fixed to an abutment 205, which is fixed to plate 300.

In particular, one of the two arms 202a, 202b, has, for all purposes, connected load cell 203, whereas the opposite one is equipped with a simple pin 204 for connecting with abutment 205.

When it is necessary to carry out a measurement of the maximum torque that can be delivered by drilling equipment 102, it is firstly necessary to disassemble possible drilling tool 104 connected to battery 103 of drilling rods 102a, and thus mount device 200 as previously described.

Subsequently, it is necessary to make excavation equipment 102 dispense the maximum torque available, and this is indeed possible through the capability of blocking device 200 object of the present invention, which blocks the rotation of battery 103 or of the shaft of the motor creating a resistant load which is, in any case, greater with respect to the maximum torque that can be delivered by drilling equipment 102. The torque is thus transferred to abutment 205 through the two arms 202a, 202b and it is thus transformed into two forces with equal value and opposite sign, one of which is detected by the load cell 203.

Therefore, said load cell 203 is built in a way such as to detect a force acting in a direction that is perpendicular with respect to the direction of the rotation axis of battery 103 of drilling rods 102a.

Starting from the fact that the length of one lever arm 600 is known, since it can be read on a plurality of reference points 601 located on arm 202a, it is possible to read directly, alternatively or in combination, on the tool the force value just as well as the torque value delivered by drilling equipment 102. Also pin 204 can be instrumented.

In the case in which it is desired to introduce a second load cell 203 also on arm 202b, it is sufficient to connect them both in parallel so as to directly have an average signal of the two values.

The fact that there are two load cells can lead to the advantage of having reading redundancy of the torque or force values exerted by the machine and if there is a possible error in the measurements by a load cell due to a non perfect symmetry of the measuring device caused by the manufacture tolerances, it would be averaged out by the reading on the second one.

Device 200 is subject to measuring many torque levels; indeed, on each of arms 202a, 202b there is a plurality of holes 202c on which load cell 203 and pin 204 can be selectively arranged. Clearly, load cell 203, just as pin 204, must be positioned in the same holes of respective arm 202a, 202b so as to have a symmetrical torque distribution; indeed, purely as an example, if load cell 203 is positioned in the second last hole 202c1, then also pin 204 will be positioned in the second last hole 202c2 on arm 202b opposite with respect to that on which load cell 203 is mounted.

Figure 2:
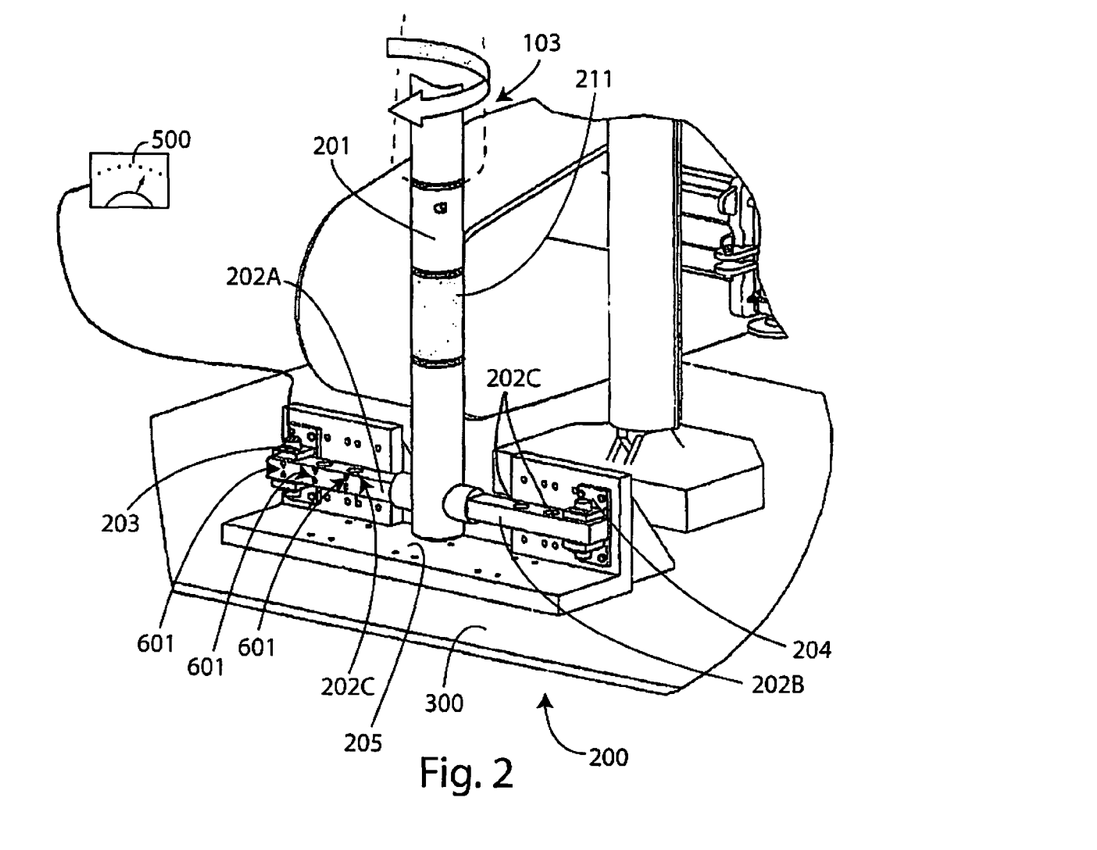
FIG. 2 illustrates a detail of the device of FIG. 1 in a first embodiment thereof.

FIG. 2 represents an elastic element 211 which is part of measuring device 200. The elastic element allows drilling battery 103 to rotate by a few degrees before being completely blocked. This device is necessary in the case in which rotary 102 is made with motors having a non maximal performance when in stall mode. Therefore, when there are motors of this kind, when in stall mode, there is in reality a reading of the torque which is lower than the maximum torque which can actually be obtained. By using this elastic element 211, therefore, electric/electronic measuring tool 500 reads a small peak which is the maximum torque value at a dynamic behaviour of the motor. The measuring method described here, is thus defined as "almost static", since at a first and brief dynamic step, in which typically the drilling rod or shaft do not even carry out a full rotation, there is then, in any case, a stalling step.

In other words, the elastic element forms the static ending block due to a torque or force action equal and opposite with respect to said force or torque exerted. Elastic element 211 can be, as an example and not for limiting purposes of the type with compression traction means, torsion springs, hydraulic springs or rubber elements.

Figure 3:
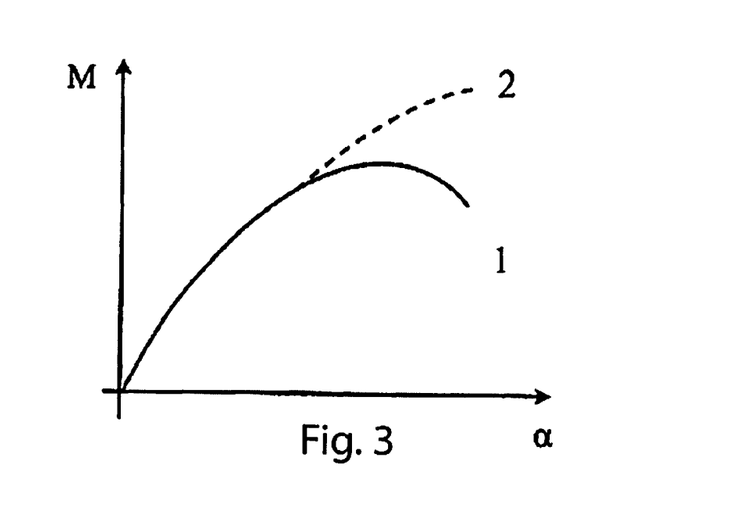
FIG. 3 illustrates a chart of the trend of the torque as a function of the rotation angle obtained through the use of the device for measuring the torque object of the present invention.

FIG. 3 shows a diagram that can be obtained with measuring device 200, in which M, in the ordinate, indicates the torque delivered by the rotary and α, in abscissa, is the rotation angle of the battery. Through measuring tool 500 it is thus possible to obtain a series of data of the torque delivered by rotary 102 and to correlate them to the rotation angle of the battery. With certain types of motors a diagram is thus obtained of the type indicated with line 1 (continuous line), which has a peak before the stopping of the motor which is obtained when in stall mode. With other types of motors that do not have this problem a trend type 2 (broken line) will be obtained. The tester type instrument means also make it possible to record the data acquired by the load cells and to reprocess them through a personal computer. In this way it is also possible to evaluate and compare the performances in stall mode and the dynamic performances of the motor used and of the overall system.

As illustrated in FIG. 4, device 200 object of the present invention can also be used to carry out measurements on the pull-push of drilling machine 100. The embodiment of device 200 shown in FIG. 3 differs from that identified and described in FIGS. 1 and 2, respectively, only for the fact that arms 202a, 202b are rotated by 90° with consequent rotation also of load cells 203.

In this case, in addition to abutment 205, device 200 also comprises a pair of upright elements 205a, 205b, each fixed to abutment 205; said upright elements 205a, 205b avoid the interference between the lower part of engaging means 201 and abutment 205 itself.

Also in this case, since there two arms, load cell 203 undergoes only half of the force load which can be exerted by machine 100.

Alternatively, it is however possible to make device 200 operate with a single load cell 203; in said case it will be fixed to a plurality of holes 205c present on abutment 205, in a position in axis with engaging means 201 and, consequently, in axis with the load to be measured. Abutment 205 is, in any case, designed with a dimension that is sufficient so as to avoid flexing that is capable of distorting the measurement of the load.

Also during this use it can be advantageous for there to be elastic element 211, especially if the pull-push is obtained through a catenary and with types of geared motors which have performances that are greater in dynamic behaviour than in static behaviour.

Elastic element 211 can thus operate in torsion and in traction compression.

Figure 5A:
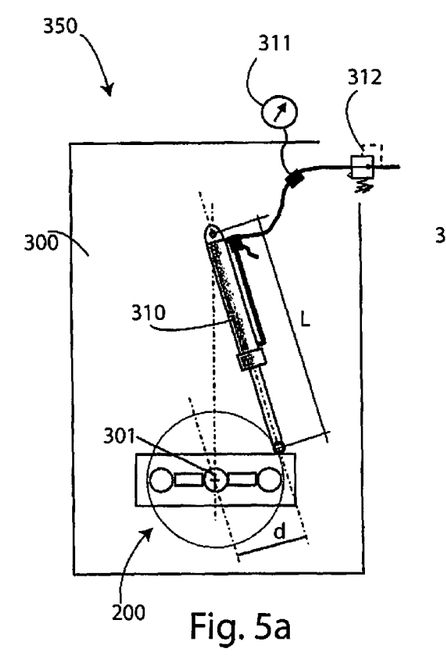
FIGS. 5a and 5b represent the measuring device object of the present invention mounted on a test bench.
Figure 5B:
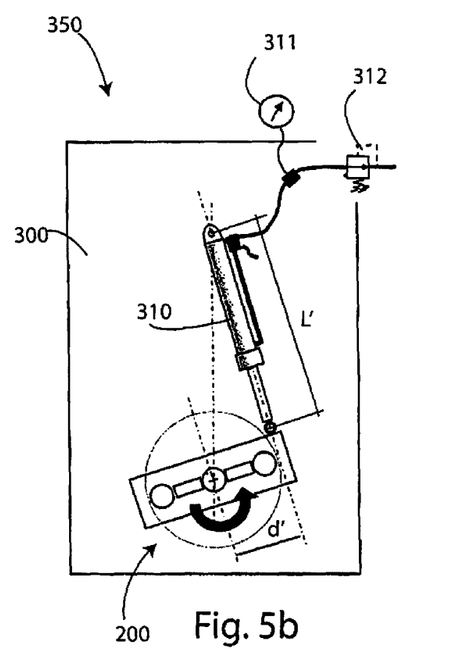

FIG. 5 indicates measuring device 200 in a configuration for measuring torque mounted on testing equipment 350. This equipment comprises a support 300, which could be a plate like that which was previously described on which machine 100 can be mounted and locked in place with its own weight. Measuring device 200 is mounted on a pin 301 fixed on support 300 and has the possibility of rotating around the axis of this pin. There is also an instrumented jack 310 which regulates the rotation of device 200.

The hydraulic system of the jack comprises a pressure transducer 311 and a pressure regulator 312. With this equipment, by regulating pressure with 312 it is possible to create a gradual stall torque at rotary 102 and make a complete curve which completely characterises its behaviour.

With this almost static system it is thus possible to make a torque-rotation speed curve that is typically obtained with complex dynamic systems. Jack 310 has a sensor inside it which makes it possible to know its stroke. Based upon this stroke and on the geometrical relations which correlate the lever arm d of the jack to the length itself of the jack it is always possible to find the torque delivered by rotary 102 even indirectly from the pressure readings of jack 310 itself.

Figure 6:
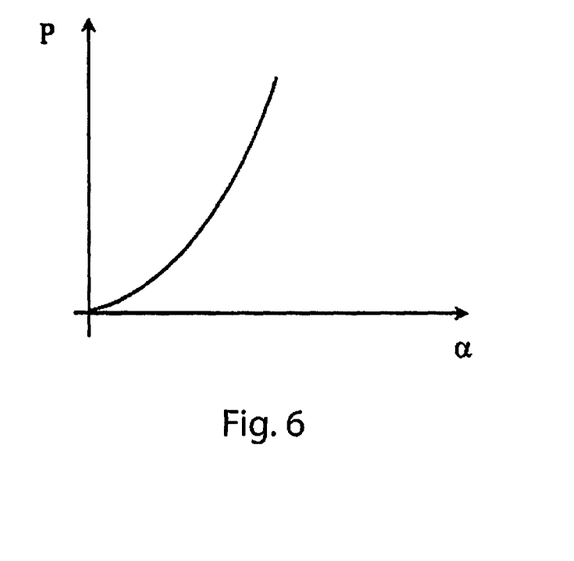
FIG. 6 illustrates a chart of the pressure and consequently of the force as a function of the angle of rotation that can be obtained through the measuring device object of the present invention mounted on the test bench of FIGS. 5a, 5b.

The reaction force of the jack is indeed known once its operation pressure and bore are known. Diagrams of the type of FIG. 6 are thus found in which P indicates the pressure of the jack and a indicates the rotation angle of the battery. In this way it is also possible to carry out a comparison between the reading of torque obtained with device 200 and the reading with test bench 350.

Jack 310 can technically carry out the same function as elastic element 211.

Figure 7:
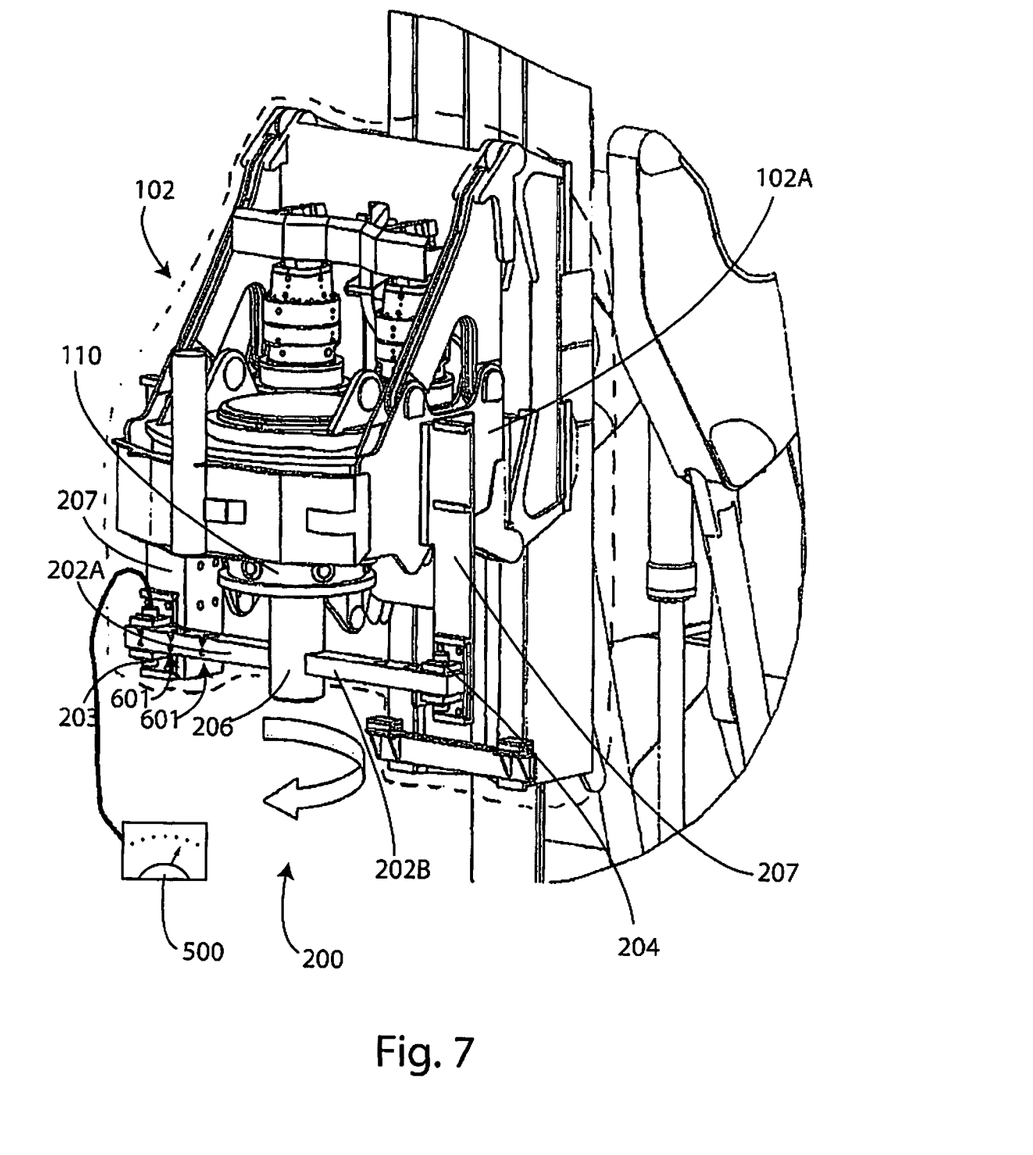
FIG. 7 illustrates a detail of the device of FIG. 1 in a second embodiment thereof.

FIG. 7 shows a second embodiment of device 200; in said second embodiment there is no longer abutment 205; engagement means 201 are, on the other hand, fixed, through a plurality of brackets, directly to drilling equipment 102. Therefore, in the second embodiment, the maximum torque delivered by drilling equipment 102 unloads straight onto the equipment itself.

More precisely, on a frame 102a of drilling equipment 102 on which two removable elements 207 are installed, operating as supports for load cell 203 and for pin 204, which are mounted on a respective arm 202a, 202b, exactly of the type described in the first embodiment of device 200.

The second embodiment does not therefore need abutment 205, but it can be installed directly on the excavation or drilling machine.

Also in this embodiment there can be an elastic element, which is not represented, with the advantages previously described.

Figure 8:
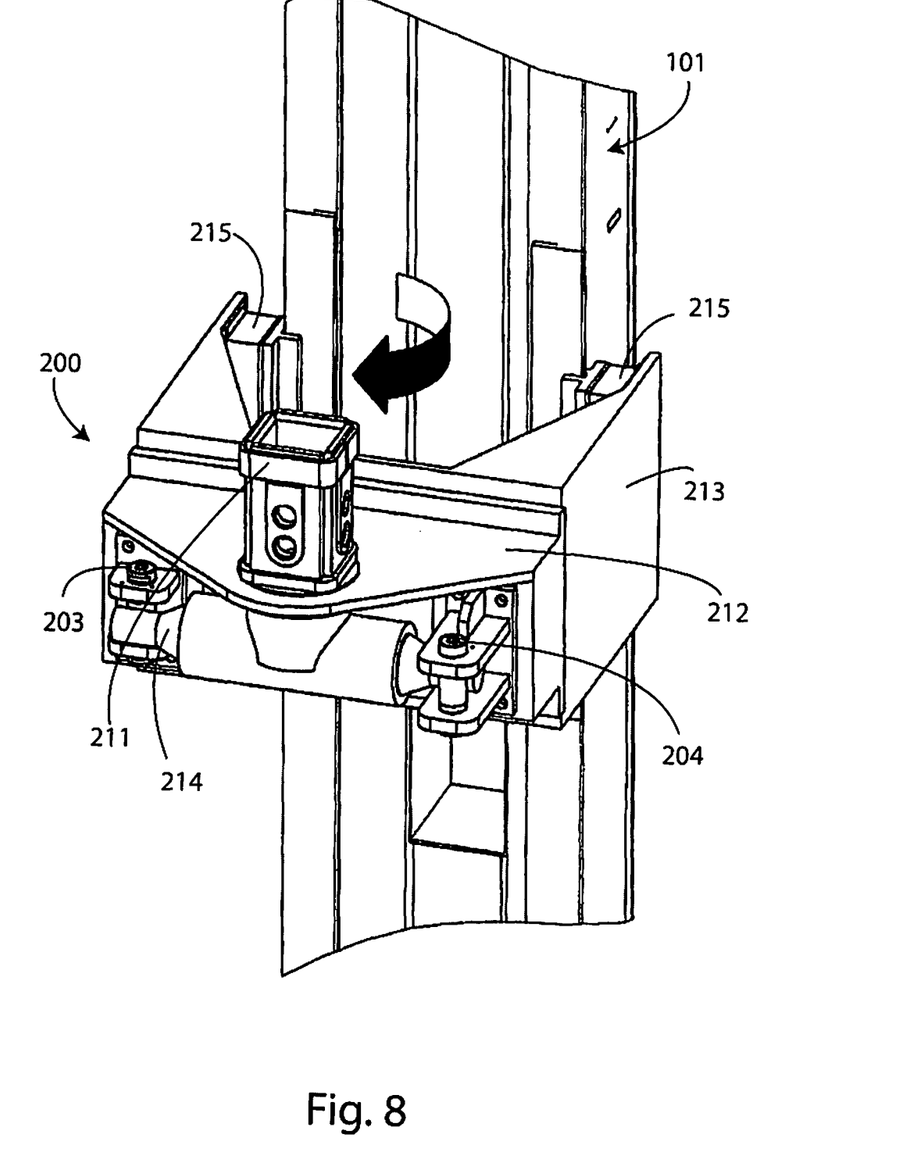
FIG. 8 illustrates a detail of a third embodiment of the device object of the present invention.

FIG. 8 illustrates a third embodiment of device 200 object of the present invention. In this case the device exploits the same antenna 101 of the machine so as to deliver the maximum torque to the rotary.

A support element 212, which is in turn engaged with an interface element between device 200 and antenna 101 of machine 100 is also coupled with central element 211.

In this case the device is simplified, and it can carry out the measuring of the torque in a single rotation direction since shaft 214 comes into contact with load cells 203 and 204 through a cylindrical surface and only on one side.

A different embodiment which obviates the measurement problem as such, is the one that takes into consideration the disassembly of the two flanged supports which carry load cells 203 and 204 and their inversion.

The distance between the load cells is in this case fixed and a distance of a meter can be advantageously used so that the force read by the load cell has the same numeric value as the torque. The reading can thus be made with a tester which is not programmed and that is more cost-effective.

As a further variant elastic elements 215 are represented made in this case like buffers in elastic material, with the same function as the element previously described 211. In this case they are placed between antenna 101 and an adapting support 213.

Figure 9A:
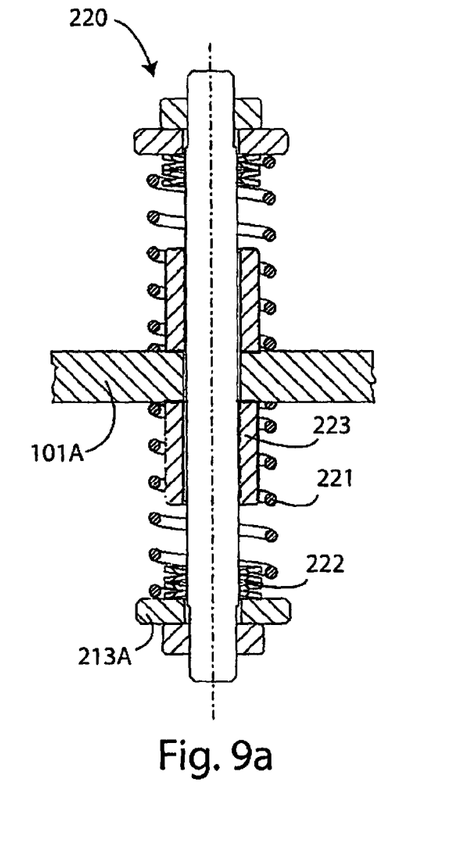
FIGS. 9a, 9b represent a detail of an alternative embodiment of a part of the measuring device illustrated in the previous FIG. 8.
Figure 9B:
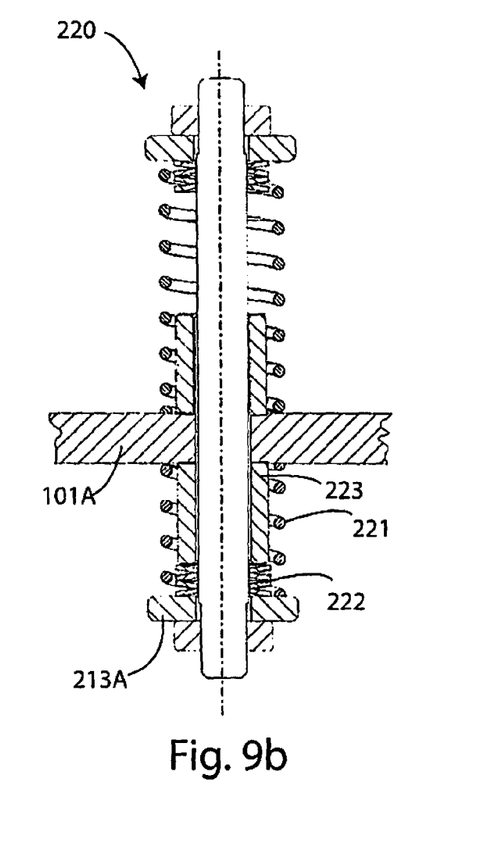

A variant of elastic elements 215 is represented in FIG. 9a and in FIG. 9b; in said case, elastic elements 220 comprise two springs of compression type 221 and some cup springs 222. There are at least two elastic elements 220 on each side.

When a measurement of the torque is carried out with device 200 object of the present invention, there is a first compression of the more yielding helicoidal springs and when spacer 223 of elastic elements 220 comes into contact with the much stiffer cup springs 222, a resistant load is obtained such as to deliver the maximum torque to the rotary.

Figure 10:
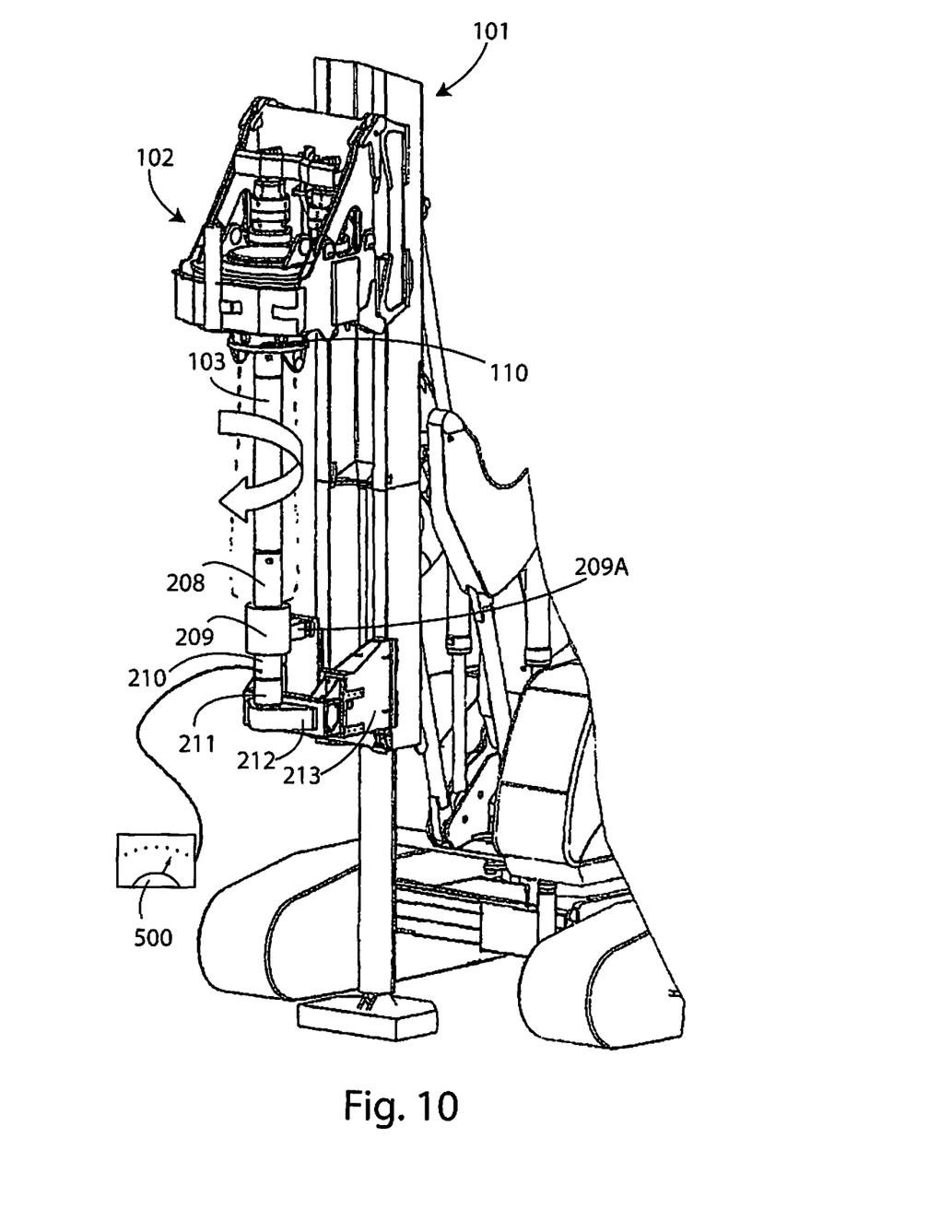
FIG. 10 illustrates a detail of a fourth embodiment of the measuring device object of the present invention.

FIG. 10 shows a further variant of device 200 in which the retroaction on the antenna itself of the machine is exploited once again.

Device 200 in its fourth embodiment also comprises torque transducer means which this time comprise a torsion sensor or torque meter 210, axially engaged with said cylindrical element 208 by means of a gear transmission box 209, which is particularly useful if machine 100 is able to dispense particularly high torque. The purpose of gear transmission box 209 is thus that of sending a lower torque to torque meter 210, so as to tackle a possible lack of transducer means that are capable of detecting the maximum direct torque actually delivered by equipment 102 to the tool.

If it is necessary to carry out a measurement of the maximum torque that can be delivered by drilling equipment 102, it is necessary first of all to dismount the possible drilling tool 104 (not represented in the figures) connected to battery 103 of drilling rods 102a, and thus mount device 200 as previously described.

Subsequently, it is necessary to make excavation equipment 102 dispense the maximum torque available, and this is possible indeed through the capability of blocking device 200 object of the present invention, which blocks the rotation of battery 103 or of the motor shaft creating a resistant load that is in any case higher with respect to the maximum torque which can be delivered by drilling equipment 102. The torque is thus transferred to torque meter 201 through the second cylindrical element 208, and through gear transmission box 209.

Figure 11:
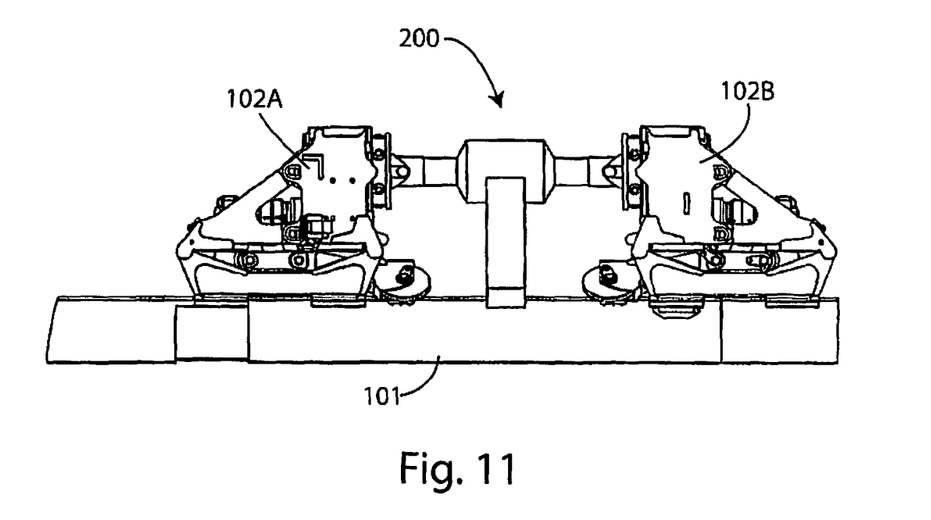
FIG. 11 illustrates an alternative embodiment that is common to all the identified variants.

FIG. 11 represents a form of use which can be common to all the variants indicated so far. It is possible to mount on an antenna 101 or analogous support two identical rotaries 102A and 102B and place device 200 between these. In this way it is possible to carry out a complete dynamic test creating a gradual load with one of the two rotaries passing from low torque and high number of revs to high torque and low number of revs until stalling. In said way it is however necessary to provide measuring device 200 with a rotary electric joint to bring the signal of load cells 203 or of torque meter 210 out from the rotating part.

The advantages of device 200 object of the present invention are known in light of the previous description. In particular, it makes it possible to deliver and measure a maximum torque as well as a pull-push force exerted by a drilling machine at its excavation or drilling tool.

The measuring device object of the present invention also makes it possible through the use of elastic elements 211, 215, 220 to carry out torque and pull-push measurements that are almost static, which when there are certain types of motors are much more precise than the single static measurements keeping the system cost-effective.

There is thus the advantage of having a system that is very precise and simple which does not require there to be sliding electrical contacts to bring the signals read from the rotating part to the tester. This, on the other hand, is required in dynamic reading systems. Therefore, said device provides true information about how much torque or force is really available to the tool, i.e. how much torque or force can then be actually transferred to the ground during the drilling.

The measurement of the rotation torque of the excavation tool occurs in a symmetrical or axial-symmetrical manner thus eliminating problems of flexing of the batteries of rods with consequent damage thereof and measurements that are not precise.

The device object of the present invention, finally, is not directly installed on the drilling or excavation machine but, on the contrary, it is independent; consequently it is particularly effective as a tool for testing or measuring the maximum torque or forces of pull or push on a plurality of drilling or excavation machines. Its most appropriate application is therefore testing drilling or excavation machines, although said application should not be considered limiting since it is just as possible to use device 200 object of the present invention even to verify possible problems present on the machine itself.

Particularly advantageous is the possibility of being able to feedback the torque on the antenna of the machine or on the rotary itself, since this action requires the sole use of the device of the present invention to carry out the torque measurement without requiring other equipment.

Finally, it is just as useful to be able to have a representation of a diagram showing the force or torque exerted by the rotary, in which it is possible to see both maximum value and the shape of the torque and force curve as a function of a load applied by the motor or of the rotation angle, thus making it possible to analyse a plurality of torque or force values that are even different from the maximum value.

Device 200 described so far can be modified with variations, modifications and additions, which are obvious to a man skilled in the art without for this reason departing from the scope of protection provided by the attached claims.

The invention claimed is:

1. A device for measuring the torque or force exerted by a drilling machine during a rotation, driving or lifting of a tool; said measuring device comprising:
    means for engaging a drilling battery or a shaft of at least a drilling equipment or rotary of said machine; said means for engaging being configured for symmetrically or axial-symmetrically locking said drilling battery or said shaft preventing the rotation or the axial displacement in a position in correspondence to said tool and said means for engaging is being associated with at least a transducer for the detection of at least a maximum torque or of at least a maximum force exerted by said machine;
    said measuring device being fixedly constrained to said drilling battery or to said shaft and being configured for detecting said torque or said maximum force with a static ending block of said drilling battery or of said shaft;
    an elastic element engaging said static ending block after a rotation or an axial displacement corresponding to a force or torque action equal or contrary to said exerted force or torque.

2. A device for measuring torque or force exerted by a drilling machine during a rotation, driving or lifting of a tool; said measuring device comprising:
    means for engaging a drilling battery or a shaft of at least a drilling equipment or rotary of said machine; said means for engaging being configured for symmetrically or axial-symmetrically locking said drilling battery or said shaft preventing the rotation or the axial displacement in a position in correspondence to said tool and said means for engaging is being associated with at least a transducer for the detection of at least a maximum torque or of at least a maximum force exerted by said machine;
    said measuring device being fixedly constrained to said drilling battery or to said shaft;
    wherein said means for engaging comprise a pair of arms radially extending from a central element; each of the arms having a first end constrained to said central element and a second end opposed with respect to said first end; on at least an arm of said pair of arms is with said transducer for the detection of the torque or maximum force.

3. The measuring device according to claim 2, wherein each arm of said pair of arms is coupled to a respective transducer.

4. The measuring device according to claim 2, comprising a pair of supporting elements of said transducer means for the detection of the maximum torque.

5. The measuring device according to claim 2, wherein the measuring device is configured to measure said at least maximum torque on a lever arm selected among a plurality of lever arms of different length, and wherein each of said arms comprise a plurality of holes upon which is selectively constrainable said transducer for the detection of the maximum torque.

6. The measuring device according to claim 2, wherein said transducer for the detection of the maximum force is configured to measure at least a force along a direction orthogonal to a rotation axis of said shaft or drilling battery.

7. The measuring device according to claim 2, wherein said transducer for the detection of the maximum force is configured to measure at least a force along a direction parallel to a rotation axis of said shaft or drilling battery.

8. The measuring device according to claim 7, further comprising a gear transmission box interposed between said drilling battery or said shaft and said transducer.

9. The measuring device according to claim 1, wherein said transducer is a load cell.

10. The measuring device according to claim 1, wherein said transducer is a torque measurer or torque meter.

11. The measuring device according to claim 1, comprising a display instrument representing and/or storing a plurality of torque or force values detected by said transducer; said plurality of torque or force values comprising a maximum torque or force value.

12. The measuring device according to claim 3, wherein said display instrument represents a torque or force value mediated between two values measured by respective transducers.

13. The measuring device according to claim 1, wherein said display instrument represents a torque or force value trend linked to elastic rotation of the device.

14. A device for measuring torque or force exerted by a drilling machine during a rotation, driving or lifting of a tool; said measuring device comprising:

means for engaging a drilling battery or a shaft of at least a drilling equipment or rotary of said machine; said means for engaging being configured for symmetrically or axial-symmetrically locking said drilling battery or said shaft preventing the rotation or the axial displacement in a position in correspondence to said tool and said means for engaging is being associated with at least a transducer for the detection of at least a maximum torque or of at least a maximum force exerted by said machine;

said measuring device being fixedly constrained to said drilling battery or to said shaft and being configured for detecting said torque or said maximum force with a static ending block of said drilling battery or of said shaft;

a linear actuating element contrasting with a torque transmitted by the machine and wherein torque progressive variation is determined by change of inner pressure of a cylinder.

15. The measuring device according to claim 11, wherein said linear actuating element is a cylinder and wherein a trend of pressure values of said cylinder determines the resisting torque which is compared to the torque registered by said display instrument by the measuring device to verify the correctness of measurement.

16. A device for measuring torque or force exerted by a drilling machine during a rotation, driving or lifting of a tool; said measuring device comprising:

means for engaging a drilling battery or a shaft of at least a drilling equipment or rotary of said machine; said means for engaging being configured for symmetrically or axial-symmetrically locking said drilling battery or said shaft preventing the rotation or the axial displacement in a position in correspondence to said tool and said means for engaging is being associated with at least a transducer for the detection of at least a maximum torque or of at least a maximum force exerted by said machine;

said measuring device being fixedly constrained to said drilling battery or to said shaft;

wherein said torque is measured in a retroaction configuration that is on the frame of the rotary or on the antenna.

* * * * *